United States Patent
Conrad et al.

(10) Patent No.: US 7,987,121 B2
(45) Date of Patent: Jul. 26, 2011

(54) SYSTEMS AND METHODS FOR GENERATING AN ACCOUNTING DOCUMENT

(75) Inventors: Michael Conrad, Reilingen (DE); Christiane Cramer, Weingarten (DE); Georg Dopf, Schwetzingen (DE); Olaf Duevel, Mannheim (DE); Stefan Gauger, Heidelberg (DE); Dirk Henrich, Wiesloch (DE); Michael Hohendorf, Waghausel (DE); Franz-Joachim Hoeckenreiner, Heidelberg (DE); Markus Klein, Frankenthal (DE); Gerald Paetzold, Heidelberg (DE); Andreas Reccius, Walldorf (DE); Harald Roedel, Worms (DE); Kai-Michael Roesner, Eggenstein-Leopoldshafen (DE); Joachim Welte, Harthausen (DE)

(73) Assignee: SAP AG, Walldorf (DE)

( * ) Notice: Subject to any disclaimer, the term of this patent is extended or adjusted under 35 U.S.C. 154(b) by 1252 days.

(21) Appl. No.: 11/478,137

(22) Filed: Jun. 30, 2006

(65) Prior Publication Data

US 2008/0004998 A1 Jan. 3, 2008

(51) Int. Cl.
*G07F 19/00* (2006.01)

(52) U.S. Cl. .......................................................... 705/30
(58) Field of Classification Search ....................... 705/30
See application file for complete search history.

(56) References Cited

U.S. PATENT DOCUMENTS

| 6,330,545 B1 * | 12/2001 | Suh ................................. 705/30 |
| 7,120,597 B1 * | 10/2006 | Knudtzon et al. ............... 705/30 |
| 2005/0131782 A1 * | 6/2005 | Thuneby et al. ................ 705/30 |
| 2006/0149643 A1 * | 7/2006 | Reiner et al. ................... 705/30 |

* cited by examiner

*Primary Examiner* — Ramsey Refai
(74) *Attorney, Agent, or Firm* — Finnegan, Henderson, Farabow, Garrett & Dunner, LLP (57) ABSTRACT

Systems and methods are provided for generating an accounting document. In one implementation, a computer-implemented method is provided. A message is received that includes operational data. An accounting notification is generated that includes the operational data using a first business object. The accounting notification is processed and the accounting document is generated using a second business object. The accounting document includes a number of posting lines corresponding to the operational data. The accounting document is processed and a set of third business objects is assigned to each posting line. The set of third business objects includes at least one general ledger account business object and a plurality of sub-ledger account business objects. One or more data processing tasks are delegated to the one of the third business objects that are assigned to the given posting line.

17 Claims, 7 Drawing Sheets

| Step # | Step description | Delegates ? |
|--------|------------------|-------------|
| 1 | Check incoming data | yes |
| 2 | Derive Accounting Transaction Type | yes |
| 3 | Complete data | yes |
| 4 | Determine Set Of Bocks | no |

Fig. 4

| Step # | Step description | Delegates ? |
|---|---|---|
| 5 | Create Header and Items | no |
| 6 | Document Type determination | no |
| 7 | Posting Date determination / Period lock | no |
| 8 | Check incoming data | yes |
| 9 | Activation decision / Subledger determination | yes |
| 10 | Offsetting subledger determination | no |
| 11 | Valuation | yes |
| 12 | Debit / Credit Code determination | no |
| 13 | Account assignment determination | yes |
| 14 | G/L Account determination | yes |
| 15 | Account assignment split | yes |
| 16 | G/L Account determination | yes |
| 17 | Cost And Revenue Element determination | yes |
| 18 | G/L Movement Type determination | no |
| 19 | Functional Area determination | yes |
| 20 | Final check | yes |
| 21 | Delete zero items | no |
| 22 | Document # and Item # determination | no |
| 23 | Creation of business objects | yes |

SYSTEMS AND METHODS FOR GENERATING AN ACCOUNTING DOCUMENT

BACKGROUND

I. Technical Field

The present invention generally relates to the field of data processing. More particularly, the invention relates to computerized systems and methods for generating an accounting document.

II. Background Information

Business object technology and business object programming are based on the concept of business objects. Real world objects, such as an employee or a sales order, are modeled as business objects in business application systems, such as the SAP R/3 system. Business objects encapsulate data and business processes, thus hiding the details of the structure and implementation of the underlying data.

To achieve this encapsulation, the business objects are constructed as entities with multiple layers. At the core of a business object is a kernel, which may represent the object's inherent data. A second layer, called an integrity layer, may represent the business logic of the object. The integrity layer may include business rules and constraints that apply to the business object. A third layer, called an interface layer, may describe the implementation and structure of the business object, and defines the object's interface to the outside world. A fourth and outermost layer of a business object is called an access layer, which may define the technologies that can be used to obtain external access to the object's data, such as COM/DCOM (Component Object Model/Distributed Component Object Model).

The interface layer may separate a business object's data and the applications and technologies that can be used to access it. To the outside, business objects may reveal only their interface, which may include a set of clearly defined methods. Applications may only access the business object data by the object's methods. Further, an application program that accesses a business object and its data only needs the information required to execute the methods. Therefore, an application programmer can work with a business object and invoke its methods without having to know or consider the object's underlying implementation details.

A set of methods that is associated with a business object may represent the object's behavior. When a method is executed on a business object, the method may change the object's internal state (e.g., the object's data). Business object types and methods are typically identified and described in a repository, such as a SAP Business Object Repository (BOR) or an Enterprise Service Repository (ESR).

Business objects are also used in accounting systems. In particular, an important task of accounting is recording information. Accounting procedures value business transactions on a monetary basis and update them, providing the information for audit purposes, for example. Since different kinds of information are recorded for different business transactions, accounting documents include different accounting document items and have varied structures. Collections of accounting document items having the same structure are called ledgers.

A ledger can have an additional structure that enables a differentiation between a general ledger and different sub-ledgers. The general ledger contains all information that is the same for all business transactions. The sub-ledgers supplement the general ledger in accordance with different kinds of business transactions and information.

Using general ledgers and sub-ledgers requires consistency between the information across the general ledgers and sub-ledgers. Data consistency can be provided by avoiding data redundancies and can be accomplished by distributing the accounting document items over general ledgers and sub-ledgers. Thus, several ledgers have to be read in order to completely reconstruct a business transaction in accounting.

Due to internationalization, many companies have to prepare and log the same business transaction in accordance with different accounting principles in order to meet the legal reporting requirements governed by various jurisdictions. Accordingly, there is a need for automatic and consistent creation of accounting documents in accordance with different accounting principles.

SUMMARY

Consistent with the present invention, a data processing system generates an accounting document. The data processing system includes means for receiving operational data of a business transaction, a first business object for providing an accounting notification in response to receipt of the operational data, an accounting notification carrying the operational data, and a second business object for providing the accounting document in response to the accounting notification. The accounting document includes a number of posting lines corresponding to the operational data, a processing component for processing the accounting notification and the accounting document, and a set of third business objects. The set of third business objects includes at least one general ledger account business object and a plurality of sub-ledger account business objects. The processing component processes the accounting notification and the accounting document in a predefined sequence of steps, assigns one of the third business objects to each posting line of the accounting document, and delegates one or more data processing tasks to be performed for a given posting line to the one of the third business objects that is assigned to that posting line.

Consistent with the present invention, operational data is received from a plurality of transactional data processing systems. For example, the operational data is received in an extended mark-up language format, such as XML. An XML document containing the operational data can be received from one of the transactional data processing systems as an XI message using, for example, the SAP Exchange Infrastructure.

Consistent with the present invention, the accounting notification has the form of at least a rudimentary posting specification that corresponds to the operational data that has been pre-processed in order to generate the accounting notification. The posting specification at least partly specifies the structure and/or content of the accounting document to be generated.

Consistent with the present invention, the first business object includes a first semantic key referencing a source of the operational data and a type specification for indicating a type of the operational data, such as incoming invoice, outgoing invoice, and salary payment. The type indication and/or the first semantic key can be used for controlling the step by step processing of the accounting notification and/or of the accounting document as the type and/or the source of the operational data may determine or influence the business logic to be applied for further processing.

Consistent with the present invention, the second business object includes a second semantic key comprising a company name to which the accounting document belongs, fiscal year, set of books, and/or accounting document number.

Consistent with the present invention, the accounting notification is generated by the processing component by using the received operational data and adding some data via several processing steps.

Consistent with the present invention, first and second data containers are generated for processing the accounting notification and the accounting document data during execution of the respective predefined sequences of processing steps.

Consistent with the present invention, one or more data processing tasks related to the valuation of a posting item are delegated to one or more of the third business objects.

Consistent with the present invention, each posting item is processed individually using its assigned third business object.

Consistent with the present invention, a method for generating an accounting document includes receiving a message carrying operational data, generating an accounting notification carrying the operational data using a first business object, and generating the accounting document using a second business object. The accounting document includes a number of posting lines corresponding to the operational data. The method further includes processing the accounting document in a predefined sequence of steps and assigning one of a set of third business objects to each posting line. The set of third business objects includes at least one general ledger account business object and a plurality of sub-ledger account business objects. One or more data processing tasks to be performed are delegated for a given posting line to the one of the third business objects which is assigned to that posting line.

It is to be noted that the term "operational data" as used herein may relate to any kind of business transaction. "Operational data" is directly related to the execution of a business transaction, whereas secondary processing on the operational data, such as valuations, account determination, etc., is performed by embodiments of the accounting system of the invention.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention provide an inbound interface for business processes. For example, the SAP exchange infrastructure can be used for implementation of such a layer of interfaces such that operational data is sent from operational system components to an accounting system by means of XI messages.

Figure 1:
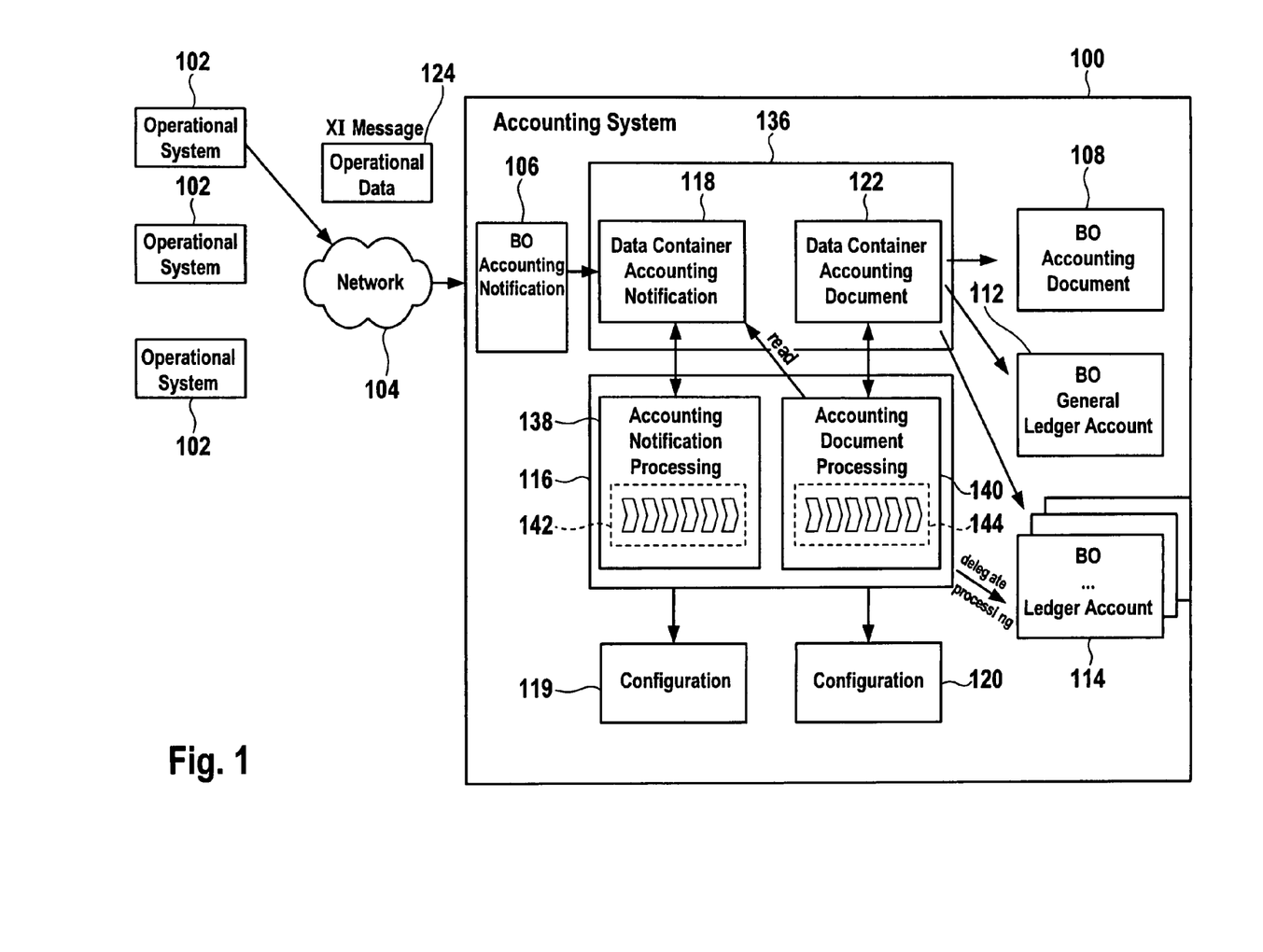
FIG. 1 is a block diagram of a data processing system, consistent with an embodiment of the present invention.

FIG. 1 shows an accounting system 100, consistent with an embodiment of the present invention. Accounting system 100 is coupled to a number of operational systems 102 that are used for performance of various operational tasks, such as performing payments, receiving payments, receiving goods, etc. Operational systems 102 and accounting system 100 are coupled by a network 104, such as a computer network (e.g., an intranet or the Internet). Operational systems 102 and accounting system 100 may implement the SAP exchange infrastructure, for example.

Accounting system 100 may include a first business object (i.e., the accounting notification business object 106). Business object 106 may represent the financial accounting view of, for example, a logistical business transaction and provides services for processing XI messages in accounting. This enables a uniform accounting view of the logistical XI messages so that all logistical messages can be processed according to a common procedure.

Further, accounting system 100 may include a second business object (i.e., an accounting document business object 108). Business object 108 may be designed to represent business transactions in financial accounting for the purposes of reporting such business transactions. An instance of business object 108 (i.e., an accounting document) is a joint document for a general ledger account business object 112 and sub-ledger account business objects 114 of accounting system 100. Therefore, the accounting document contains information relevant for the respective sub-ledgers.

Accounting system 100 may include a processing component 116 for processing of accounting notification data and accounting document data. Processing of the accounting notification data and the accounting document data is performed in respective predefined sequences of processing steps that are independent from the operational data. One or more of the data processing tasks that is to be executed for performing a given processing step of sequences 142 and/or 144 may or may not be delegated by processing component 116 to one of the business objects of the accounting system, such as the business object 112, or one of the business objects 114. Configuration of the processing steps and the delegation of such data processing tasks is specified in storage 119 and storage 120 of accounting system 100, respectively.

For example, a configuration stored in storage 120 may comprise a number of conditions to be applied on the operational data and/or respective posting items. If a condition is fulfilled, a respective business object that is assigned to the condition is identified and assigned to the respective posting line.

Processing component 116 can be implemented by at least one microprocessor and executes program instructions 138 and program instructions 140. Program instructions 138 may implement a first sequence 142 of generic processing steps that are independent from the operational data. Sequence 142 may process accounting notification data. Similarly, program instructions 140 may implement a second sequence 144 of generic processing steps for processing the accounting document data.

Storage 119 holds configuration data for configuration of sequence 142, such as specifying processing steps of sequence 142 and whether a given processing step delegates to one of the business objects of accounting system 100 for execution of the respective processing step. Storage 119 may also hold predefined conditions for determining business objects for the delegations. Selection of one of the business objects to which at least a part of that given processing step is delegated may be determined by applying a predefined condition to the operational data or data that has been derived from the operational data. Similary, storage 120 may specify the configuration of sequence 144.

Accounting system 100 may include a main memory 136 for temporary storage of data during run time, especially for storing a data container 118 and a data container 122. Data container 118 may be created by program instructions 138 in response to receipt of XI message 124 by accounting system 100. The structure of data container 118 may be determined by accounting notification business object 106. Data container 118 may contain the operational data received with XI message 124 and additional data that is derived from the operational data by execution of sequence 142.

Program instructions 138 may contain read instructions for reading data items from the accounting notification data that is held in data container 118 for execution of a given processing step of sequence 142. Further, program instructions 138 may comprise write instructions for writing a result of the execution of a given processing step of sequence 142 to data container 118 for completion of the accounting notification data. Similarly, processing component 116 may generate a data container 122 that contains the accounting document data (i.e., the data of the accounting document) that is to be generated. Data container 122 may be used during sequence 144. In addition, the accounting notification data stored in data container 118 is also used by program instructions 140 for performance of sequence 144.

In other words, program instructions 140 may perform one or more read access operations for reading accounting notification data from data container 118 and a number of read/write access operations on data container 122 for filling data container 122 with the resultant accounting document data. It is to be noted that data container 118 is initially filled with the operational data received as part of the XI message 124 whereas data container 122 is initially empty. The structure of data container 122 is determined by accounting document business object 108.

Accounting system 100 is designed to receive XI messages from operational systems 102, such as XI message 124, that contains operational data. Communication between operational systems 102 and accounting system 100 is performed by asynchronous messages. This means that a suitable inbound process agent of the exchange infrastructure converts the message from the specific XI message format into the universal format of accounting notification 118. The inbound process agent can call a create method of the nodes of business object 106 for creating accounting notification 118.

The operational data that has been received and transferred into data container 118 needs to be validated and further operational information may have to be added. The data to be added can be, for example, purchase order prices and delivery costs that are read from the purchase order. This is performed by execution of sequence 142. The accounting notification data is stored in data container 118 in the form of at least a rudimentary posting specification. These preparatory processing steps are carried out by processing component 116 by execution of program instructions 138.

After creation of the accounting notification data has been completed, the respective accounting document or a plurality of such accounting documents are created. This process is executed by processing component 116 by means of predefined sequence 144. At least some of the accounting notification data may be transferred to data container 122.

The data that is contained in data container 122 is structured in accordance with general ledger business object 112 and sub-ledger business objects 114. The structure may include a header and a number of posting lines that relate to various posting items. Further processing of the data contained in data container 122 for completion of the accounting document data is performed in sequence 144 of steps that may be identical for all business transactions. Each step of fixed sequence 142 and/or 144 may or may not involve delegation of one or more data processing tasks to a specialist business object. Delegation may use an identical fixed sequence of steps irrespective of the kinds of business transaction as processing logic that is not the same for all business transactions is accessed by delegation to a suitable business object. Processing component 116 implements the paradigm "sequence of steps leads" in contrast to "business transaction type leads." A dynamic semantic model implemented by accounting system 100 facilitates tracing as the data processing steps are always carried out in a fixed sequence as specified in storage 120.

In operation, accounting system 100 receives XI message 124 containing operational data from one of operational systems 102 via network 104. In response, data container 118 is generated using business object 106 and the operational data. In response to the creation of data container 118, processing component 116 executes sequence 142 and generates data container 122 using the accounting notification data to generate a header and posting lines for the accounting document being processed.

One or more conditions may be applied to the data contained in data container 122. Conditions may be applied to the posting lines or posting items in order to assign a business object to at least some or each posting line. For example, a business object that is assigned to a posting item provides the business logic that is required for valuation of the operational data that relates to the posting item. Processing of the data of data container 122 is performed by processing component 116 in sequence 144 where each processing step may or may not involve delegation.

Accounting notification business object 106, accounting document business object 108, general ledger business object 112, sub-ledger business objects 114, data container 119, and configuration data stored in storage 120 may contain database tables for persistent storage of the respective data.

Figure 2:
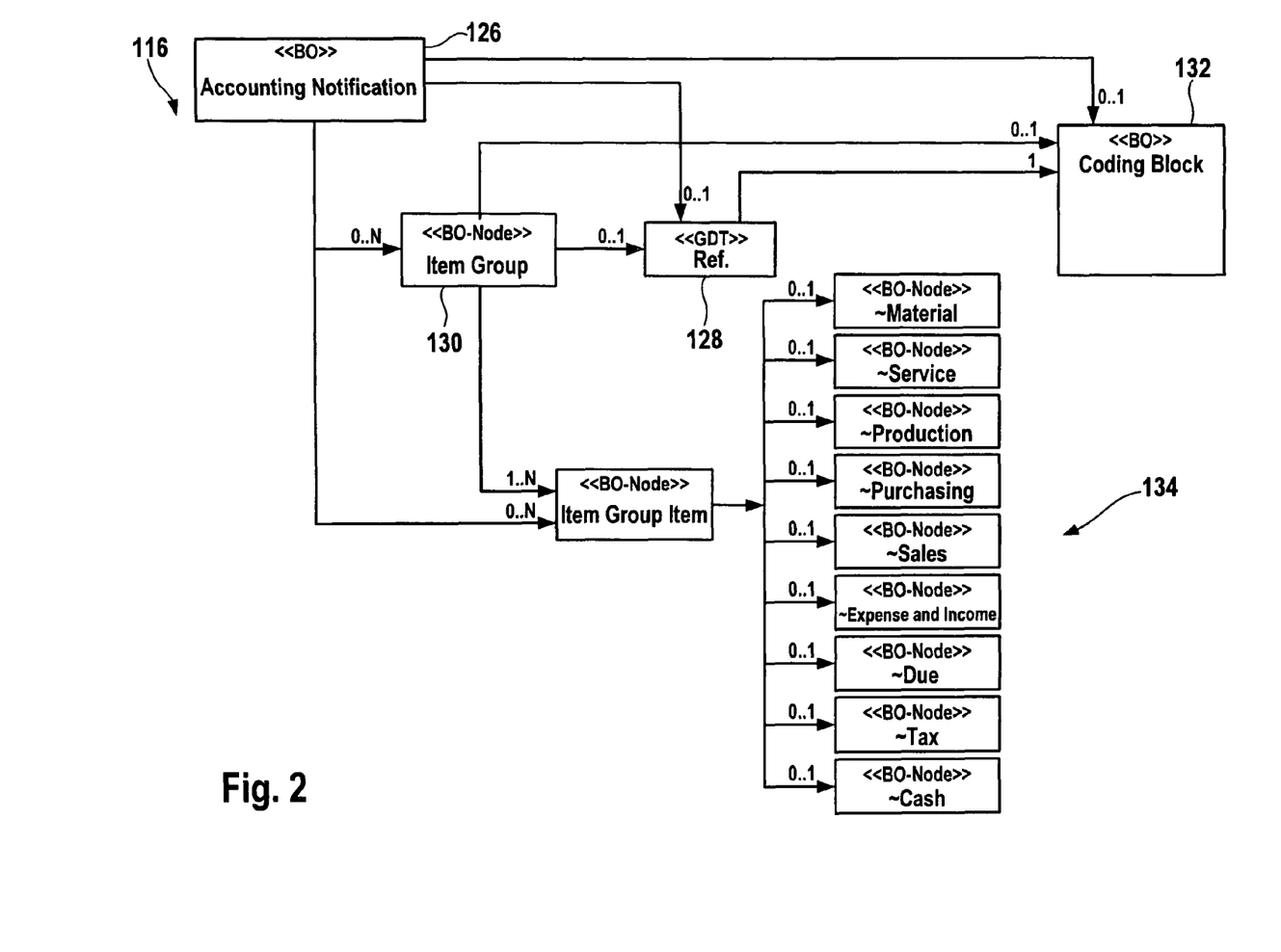
FIG. 2 is an exemplary structure of an accounting notification, consistent with an embodiment of the present invention.

FIG. 2 shows an exemplary structure of data container 118, consistent with an embodiment of the present invention. Data container 118 contains all accounting relevant information for a business transaction and has a three-level hierarchical structure that is composed of the following elements: an accounting notification node 126 that represents the document header; a semantic key of the accounting notification node is a reference to the source document, such as a reference to the business transaction; and/or the operational system that provided the operational data.

Node 128 "Business Transaction Document Reference" is on the second level of the hierarchy. Node 128 contains information regarding the reasons for a business transaction (e.g., a reference to the item of the business transaction document to which the current business transaction refers). For example, a reference to a purchase order item for which a movement of goods is recorded can be given in node 128. Further, a Business Transaction Document Reference may be assigned to the accounting notification itself or to an item group 130.

A node 132 "coding block" is also on the second level of hierarchy. This node states for whom the business transaction was triggered. A "coding block" can be assigned to the document header or an item group. For example, node 132 identifies a production order for which a confirmation is received.

Node 134 on the third level of hierarchy forms, from a logistical view, a useful subdivision of the business transaction. In addition to the reference to the item of the source document to which the node refers, the node may contain characteristics that are relevant for all business transactions. There may also be supplementary nodes that contain business transaction-specific logistical information. For example, for movements of materials there is the supplementary node "material." For every instance of a node, a supplementary node can be instantiated. Further, an "item group" groups all nodes that can be separated from the others and represent a complete sub-transaction.

Figure 3:
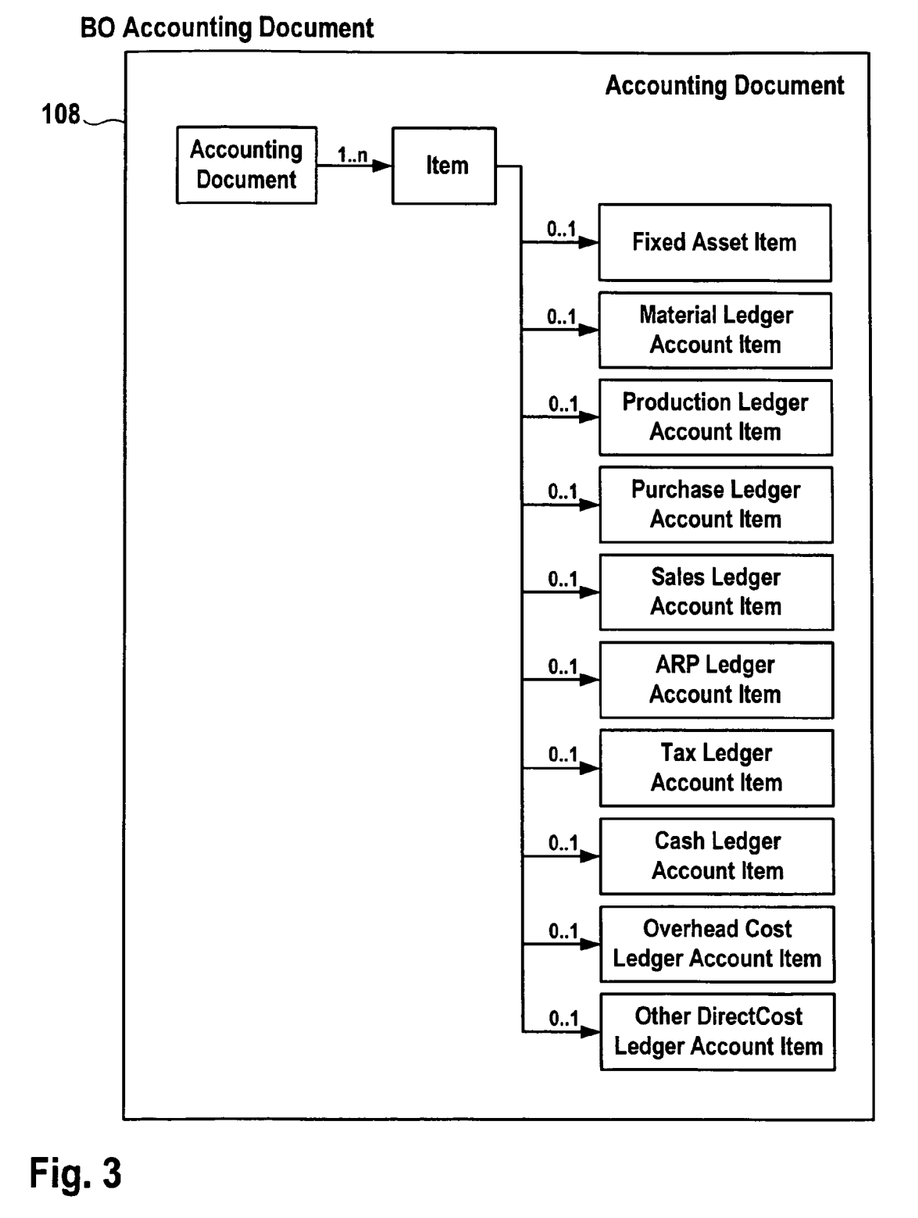
FIG. 3 is an exemplary structure of an accounting document, consistent with an embodiment of the present invention.

FIG. 3 shows an exemplary structure of business object 108, consistent with an embodiment of the present invention. Business object 108 encompasses the following aspects: a fixed asset; a material ledger account; a production ledger account; a purchase ledger account; a sales ledger account; a ARP ledger account; a tax ledger account; a cash ledger account; an overhead cost ledger account; and other direct cost ledger account.

The structure of these business objects follows a basic pattern (i.e., a business object node for line items and, if necessary, for totals and balances). The root node of a subledger or the general ledger contains the instances for which data are stored in the line item relating to the total and/or balance node. The root instance of a subledger essentially specifies for which business object of the operational or transactional system it collects the accounting data. The root instance of the general ledger essentially specifies for which general ledger account it collects the accounting data.

Figure 4:
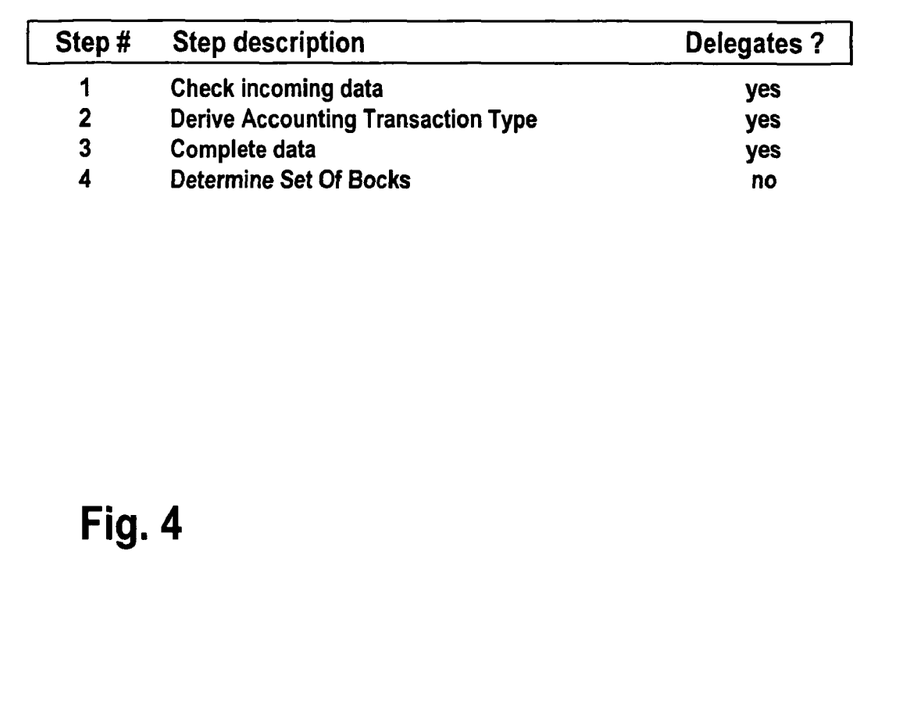
FIG. 4 is an exemplary chart showing steps performed on the accounting notification, consistent with an embodiment of the present invention.

FIG. 4 shows an example of sequence 142 containing steps 1 to 4 that are performed for processing the accounting notification data by processing component 116. Steps 1 to 3 relate to various checks and adding of certain data to the operational data. For execution of steps 1 to 3, at least some of the respective processing steps are delegated to appropriate business objects. Step 4 relates to the determination of the set of books is not delegated.

Figure 5:
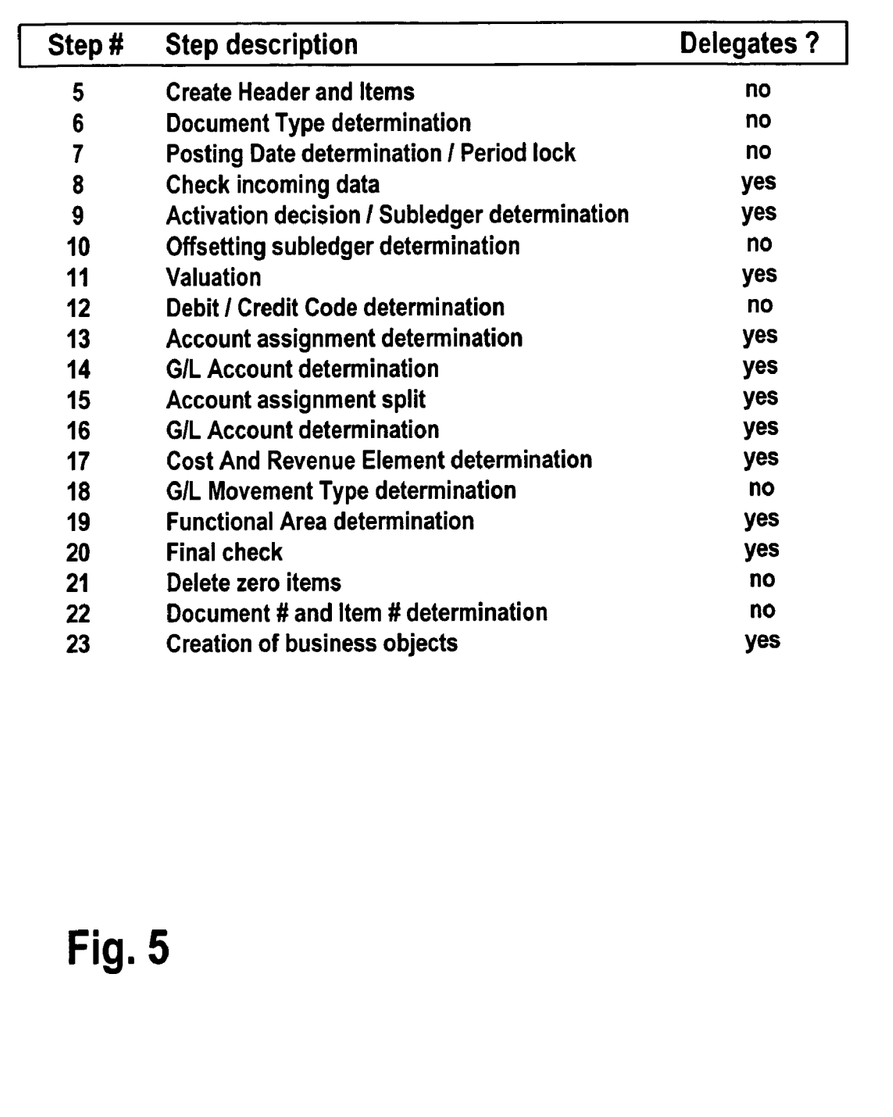
FIG. 5 is an exemplary chart showing steps performed on the accounting document, consistent with an embodiment of the present invention.

FIG. 5 shows a sequence of steps that are performed consecutively on the data contained in data container 122 for completing the accounting document data, consistent with an embodiment of the present invention. The table given in FIG. 5 indicates which ones of the steps involve delegation to a business object.

Figure 6:
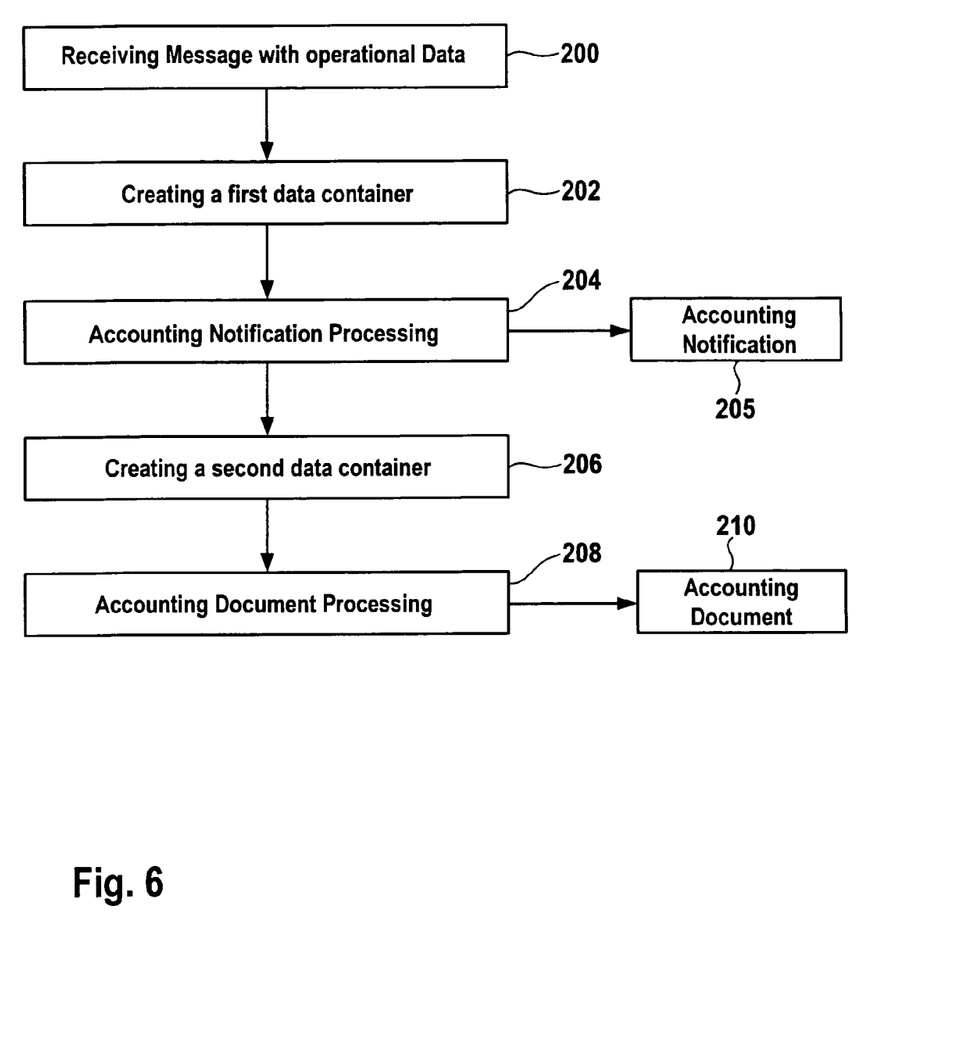
FIG. 6 is a flowchart of a method, consistent with an embodiment of the present invention.

FIG. 6 shows a flowchart, consistent with an embodiment of the present invention. In step 200, a message with operational data is received by the accounting system. In response, an instance of the accounting notification business object is created by generating a data container for holding the accounting notification data during runtime (step 202). That first data container is processed in step 204 by execution of a first sequence of predefined processing steps. After the sequence of predefined processing steps has been executed, processing of the accounting notification data is completed (step 205).

In step 206, a second data container is created that is initially empty. The second data container stores the accounting document data during runtime. The second data container is used to perform accounting document processing (step 208) in accordance with sequence 144. Execution of step 208 may encompass assignment of business objects to the posting lines of the accounting document data that is being stored by the second data container. The assignment is performed using predefined criteria that are stored in the configuration of the accounting system.

The sequence of processing steps that execute step 208 may or may not be performed using delegation to one of the business objects. For example, the posting lines are processed in sequential order. For processing of a given posting line one or more of the respective data processing tasks, a sequence may be delegated to the business object that is assigned to the posting line being processed. In step 210, processing of the accounting document data is completed.

It is to be noted that more than one accounting document can be generated in response to receipt of the operational data. For example, accounting for the operational data may need to be performed in accordance with several accounting rules or standards, depending on the regulatory requirements. In this instance, the above described sequence or parts of the above described sequence of steps 202 to 210 may need to be performed several times using these different accounting rules or standards for producing of respective accounting documents.

Figure 7:
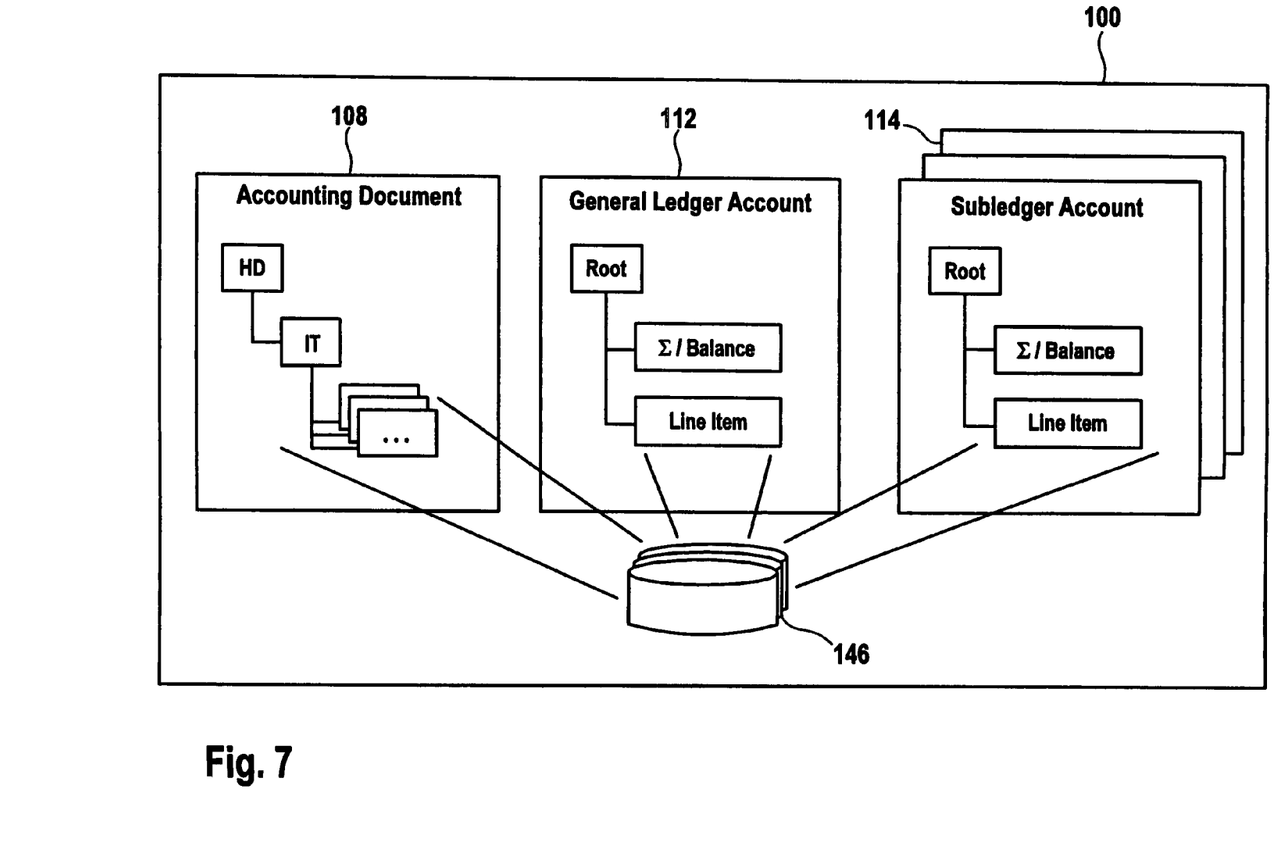
FIG. 7 is a block diagram illustrating storage of the accounting document data in a single database, consistent with an embodiment of the present invention.

FIG. 7 shows accounting system 100, consistent with an embodiment of the present invention. Accounting system 100 may include a database 146 for storing data belonging to accounting document business object, line item of general ledger business object, and line item of subledger business objects. The accounting notification data and accounting document data is stored in database 146 without redundancy. In other words, the accounting notification data and accounting document data is stored only once in database 146 without a need for storing multiple copies of the same data. Database 146 can be used by instances of accounting notification business object 108, general ledger account business object 112, and sub-ledger business object 114 for filling the respective data structures with actual data.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system for generating an accounting document, the system comprising:
a processor; and
a memory storing instructions executed by the processor to:
generate a first business object that provides an accounting notification in response to receipt of operational data, wherein the accounting notification includes the operational data;
generate a second business object that provides an accounting document in response to the accounting notification, wherein the accounting document includes a plurality of posting lines corresponding to the operational data;
process the accounting notification and the accounting document;
generate a set of third business objects that include at least one general ledger account business object and a plurality of sub-ledger account business objects;
process the accounting notification and the accounting document;
assign one of the third business objects to each posting line of the accounting document;
apply at least one predefined condition to the operational data to determine one or more data processing tasks to delegate to a business object; and
delegate, based on the application of the at least one predefined condition to the operational data, one or more data processing tasks to be performed for a given posting line to the one of the third business objects that is assigned to the given posting line.

2. The data processing system of claim 1, wherein the operational data is in an extended mark-up language format.

3. The data processing system of claim 1, wherein the accounting notification determines a posting specification for the accounting document.

4. The data processing system of claim 1, wherein the first business object includes a first semantic key for referencing a source of the operational data.

5. The data processing system of claim 1, wherein the second business object includes a second semantic key for indicating a company, a fiscal year, a set of books, or an accounting document number.

6. The data processing system of claim 1, wherein the accounting document is created using the accounting notification and the second business object.

7. The data processing system of claim 6, wherein a data container is generated that stores the accounting document during the processing of the accounting document.

8. A computer-implemented method of generating an accounting document, the method comprising:
receiving, by a processor, a message carrying operational data;
generating, by the processor, an accounting notification including the operational data using a first business object;
processing, by the processor, the accounting notification;
generating, by the processor, the accounting document using a second business object, the accounting document including a number of posting lines corresponding to the operational data;
processing, by the processor, the accounting document;
assigning, by the processor, one of a set of third business objects to each posting line, wherein the set of third business objects includes at least one general ledger account business object and a plurality of sub-ledger account business objects;
applying, by the processor, at least one predefined condition to the operational data to determine one or more data processing tasks to delegate to a business object; and
delegating, by the processor, based on the application of the at least one predefined condition to the operational data, one or more data processing tasks to be performed for a given posting line to the one of the third business objects that are assigned to the given posting line.

9. The method of claim 8, wherein the operational data is received from a transactional data processing system.

10. The method of claim 8, wherein the operational data is received in an extended mark-up language format.

11. The method of claim 8, wherein the operational data is received as an XI message.

12. The method of claim 8, wherein the accounting notification determining a posting specification for the accounting document.

13. The method of claim 8, wherein the first business object includes a first semantic key for referencing a source of the operational data.

14. The method of claim 8, wherein the second business object includes a second semantic key.

15. The method of claim 8, wherein one of the data processing tasks relates to a valuation, and wherein the one of the data processing tasks is delegated to the one of the third business objects that is assigned to a respective posting line.

16. The method of claim 8, further comprising:
storing accounting document data without redundancy in a single database.

17. A non-transitory computer-readable storage medium storing program instructions executable by a processor to perform a method that generates an accounting document, the method comprising:
receiving a message carrying operational data;
generating an accounting notification including the operational data using a first business object;
processing the accounting notification;
generating the accounting document using a second business object, the accounting document including a number of posting lines corresponding to the operational data;

processing the accounting document;
assigning one of a set of third business objects to each posting line, wherein the set of third business objects includes at least one general ledger account business object and a plurality of sub-ledger account business objects;
applying at least one predefined condition to the operational data to determine one or more data processing tasks to delegate to a business object; and delegating, based on the application of the at least one predefined condition to the operational data, one or more data processing tasks to be performed for a given posting line to the one of the third business objects that are assigned to the given posting line.

* * * * *